US009298786B1

(12) United States Patent
Wang et al.

(10) Patent No.: US 9,298,786 B1
(45) Date of Patent: Mar. 29, 2016

(54) DEFERRED CONTENT PRESENTATION (71) Applicant: Google Inc., Mountain View, CA (US)

(72) Inventors: Gang Wang, Frederick, MD (US); Zutao Zhu, Elmhurst, NY (US)

(73) Assignee: Google Inc., Mountain View, CA (US)

( * ) Notice: Subject to any disclaimer, the term of this patent is extended or adjusted under 35 U.S.C. 154(b) by 175 days.

(21) Appl. No.: 14/264,403

(22) Filed: Apr. 29, 2014

(51) Int. Cl.
*G06F 17/30* (2006.01)

(52) U.S. Cl.
CPC ............................ *G06F 17/30554* (2013.01)

(58) Field of Classification Search
CPC .................................................. G06F 17/30554
See application file for complete search history.

(56) References Cited

U.S. PATENT DOCUMENTS

| 2001/0056504 | A1* | 12/2001 | Kuznetsov | G06F 8/30 719/310 |
|---|---|---|---|---|
| 2002/0082941 | A1 | 6/2002 | Bird | |
| 2002/0143822 | A1* | 10/2002 | Brid | G06F 17/30905 |
| 2003/0110236 | A1* | 6/2003 | Yang | H04L 29/06 709/219 |
| 2004/0267965 | A1* | 12/2004 | Vasudevan | G06F 17/30905 709/250 |
| 2007/0112859 | A1* | 5/2007 | Joshi | H04L 12/2803 |
| 2007/0157220 | A1* | 7/2007 | Cordray | H04H 60/65 725/9 |

OTHER PUBLICATIONS

Intro to Google Offers—Google Offers Help. Google (online), [Retrieved on Mar. 7, 2014]. Retrieved from the Internet: https://support.google.com/offers/answer/1142594?hl=en, 2 pages.
E-Commerce—Google Wallet and Apple's Passbook: Five Differences Retailers Need to Know, Google (online), [Retrieved on Mar. 7, 2014]. Retrieved from the internet: https://www.internetretailer.com/commentary/2014/02/11/google-wallet-and-apples-passbook-five-keydifferences, 2 pages, 5 pages.
Engage your users through Wallet Objects—Wallet Objects Help. Google (online), [Retrieved on Mar. 12, 2014]. Retrieved from the internet: https://support.google.com/wallet/objects/answer/3528794?hl=en&ref_topic=3316539.
Gumtree Australia—How can I save ads for later / How does My Watchlist work / adding ads to favourites, (online), [Retrieved on Mar. 7, 2014]. Retrieved from the internet: https://help.gumtree.com.au/knowledgebase.php?article=27, 5 pages.

(Continued)

*Primary Examiner* — Syed Hasan
(74) *Attorney, Agent, or Firm* — Foley & Lardner LLP; John D. Lanza (57) ABSTRACT

Methods, systems, and apparatus for presenting deferred content are presented. In one aspect, a method includes, after presentation of a content item on a first device, receiving an indication from a user to save the content item for re-presentation; storing an identifier associated with the content item with a first identifier associated with the first device; linking identifiers associated with plural devices, browsers, or applications that are accessed by the user; receiving a request for content from a device or application based on access by the user, including receiving either the first identifier or one of the identifiers that is linked to the first identifier; determining candidate content items responsive to the request including determining that the stored identifier is associated with a candidate content item; and providing the content item for re-presentation to the user based on information associated with the request and information associated with the content item.

20 Claims, 7 Drawing Sheets

(56) References Cited

OTHER PUBLICATIONS

Mobile landscape overview, 2014 Vibes. Retrieved from the internet: http://www.slideshare.net/Vibes_Thought_Leadership/vibes-abcs-of-google-wallet-and-passbook-30915033, 19 pages.

MediaPost Publications AdKeeper Button Lets Viewers Keep, Share Ads. MediaPostNews (online), [Retrieved on Mar. 4, 2011]. Retrieved from the internet: http://www.mediapost.com/publications/article/146064/adkeeper-button-lets-viewers-keep-share-ads.html, 3 pages.

Offerobject: addmessage—Wallet Objects API—Google Developers (online), [Retrieved on Mar. 12, 2012]. Retrieved from the Internet: https://developers.google.com/wallet/objects/reference/v1/offerobject/addmessage, 3 pages.

New Startup Adkeeper Launches Allowing You to Save Ads for Later—708 Media (online), [Retrieved on Mar. 7, 2014]. Retrieved from the internet: http://www.708media.com/online_marketing/new-startup-adkeeper-save-ads-for-later/, 6 pages.

\* cited by examiner

DEFERRED CONTENT PRESENTATION

BACKGROUND

This specification relates to deferred presentation of content.

Network-enabled user devices provide access to a wide variety of applications and resources, for example, productivity applications, games, webpages, images, audio files, and videos. Such access has likewise enabled opportunities for providing relevant additional content (e.g., advertisements) to users. For example, a web page can include slots in which content items can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on an application or page hosting the slot or a request that is received for the sponsored content. The content can then be provided to the user on any devices associated with the user such as a home personal computer (PC), a smartphone, a laptop computer, or some other user device.

SUMMARY

This specification describes technologies relating to presentation of deferred content.

In general, one innovative aspect of the subject matter described in this specification can be embodied in methods that include the actions of, after presentation of a content item on a first device, receiving an indication from a user associated with the first device to save the content item for re-presentation at a later time; storing an identifier associated with the content item in a data structure along with a first identifier associated with the first device; linking a plurality of identifiers associated with plural devices, browsers, or applications that are accessed by the user, including linking the first identifier with a second different identifier associated with a different device or application than one associated with the first identifier; receiving a request for content from a device or application based on access by the user, including receiving one of either the first identifier or one of the plurality of identifiers that is linked to the first identifier along with the request; determining one or more candidate content items responsive to the request including evaluating metadata associated with a stored identifier in the data structure that is associated with the first identifier including determining that the stored identifier is associated with a candidate content item; and providing, responsive to the request, the content item for re-presentation to the user on a device associated with the request, based on a comparison of information associated with the request and information associated with the content item. Other embodiments of this aspect include corresponding systems, apparatus, and computer programs, configured to perform the actions of the methods, encoded on computer storage devices.

These and other embodiments can each optionally include one or more of the following features. Linking a plurality of identifiers may include linking plural cookies, each associated with the user and either a different device, or application. The request for content may be received from a second different device.

The first device may be a mobile device and the request for content may be received from a different non-mobile device.

The method may include conducting an auction including the candidate content items, and selecting the content item when the content item is a winner of the auction.

The method may include ranking the content item and producing a score for evaluation in the auction, wherein the ranking is based on one or more of a relevance of the content item to other information associated with the request, a time elapsed between receipt of the indication and receipt of the request, or an urgency to re-present the content item based on one or more factors.

The method may include: determining a trigger associated with the content item; and providing a reminder to a device associated with the user upon occurrence of the trigger. Determining the trigger may include determining a relevant time associated with the content item and providing the reminder at a time based on the relevant time. The relevant time may be one of an occurrence of an event that is described by the content item or an expiration of an offer associated with the content item. The method may include providing a control with the reminder that, when selected, causes re-presentation of the content item to the user.

Determining one or more candidate content items may include determining one or more candidate content items without the user being logged into a service associated with an entity that is responding to the request.

The method may include initially providing the content item to the user on the first device, including providing code for enabling the user to cause storage of the content item in the data structure for re-presentation.

The method may include receiving, along with the indication, information for controlling when to re-present the content item, including one or more preferences for re-presentation of the user.

The method may include receiving, from a content sponsor, one or more criteria for controlling re-presentation of the content item to users, and re-presenting the content item only when the criteria are satisfied.

Providing the content item for re-presentation may include altering or augmenting the content item to clearly distinguish the content item as being a re-presented content item.

Providing the content item for re-presentation may include presenting a uniform resource locator for a resource that includes one or more previously saved content items that are each associated with a respective content item identifier and one of either the first identifier or one of the plurality of identifiers that is linked to the first identifier.

The method may include encrypting the first identifier to prevent third parties from retrieving content items stored by the user.

The request for content may be associated with a plug-in for a particular application, and determining one or more candidate content items responsive to the request may include determining that the candidate content item is eligible for re-presentation in a particular manner specified by the plug-in.

Particular embodiments of the subject matter described in this specification can be implemented so as to realize none, one or more of the following advantages. Users who are interested in content items, but would prefer to view them later and/or at a different device may selectively determine to view particular content at a time or on a device more convenient for the user. Content sponsors are provided with more opportunities for presenting and re-presenting relevant content to users. The opportunity to control the manner in which content items are re-presented to users may lead to a better return on investment for content item providers. Users, in turn, are provided with content items that are more likely to be of interest to the user and at times and/or on user devices that may be more convenient for the user. In addition, saving content for later re-presentation may be performed without requiring that a user be logged into a content providing service and without requiring manual review of previously saved content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content management system facilitates the provisioning of deferred content items, such as advertisements, to users. For example, a user who views an advertisement may choose to save the advertisement for later viewing and/or interaction. The content management system may store the deferred advertisement (or an indicator thereto) and re-present the deferred advertisement to one of the user's other devices and/or applications in accordance with user preferences, instructions, and/or trigger conditions. The systems and methods disclosed herein may re-present deferred content items at the same or a different user device and, in some implementations, at predetermined times, such as times based on user and/or content provider preference.

Figure 1:
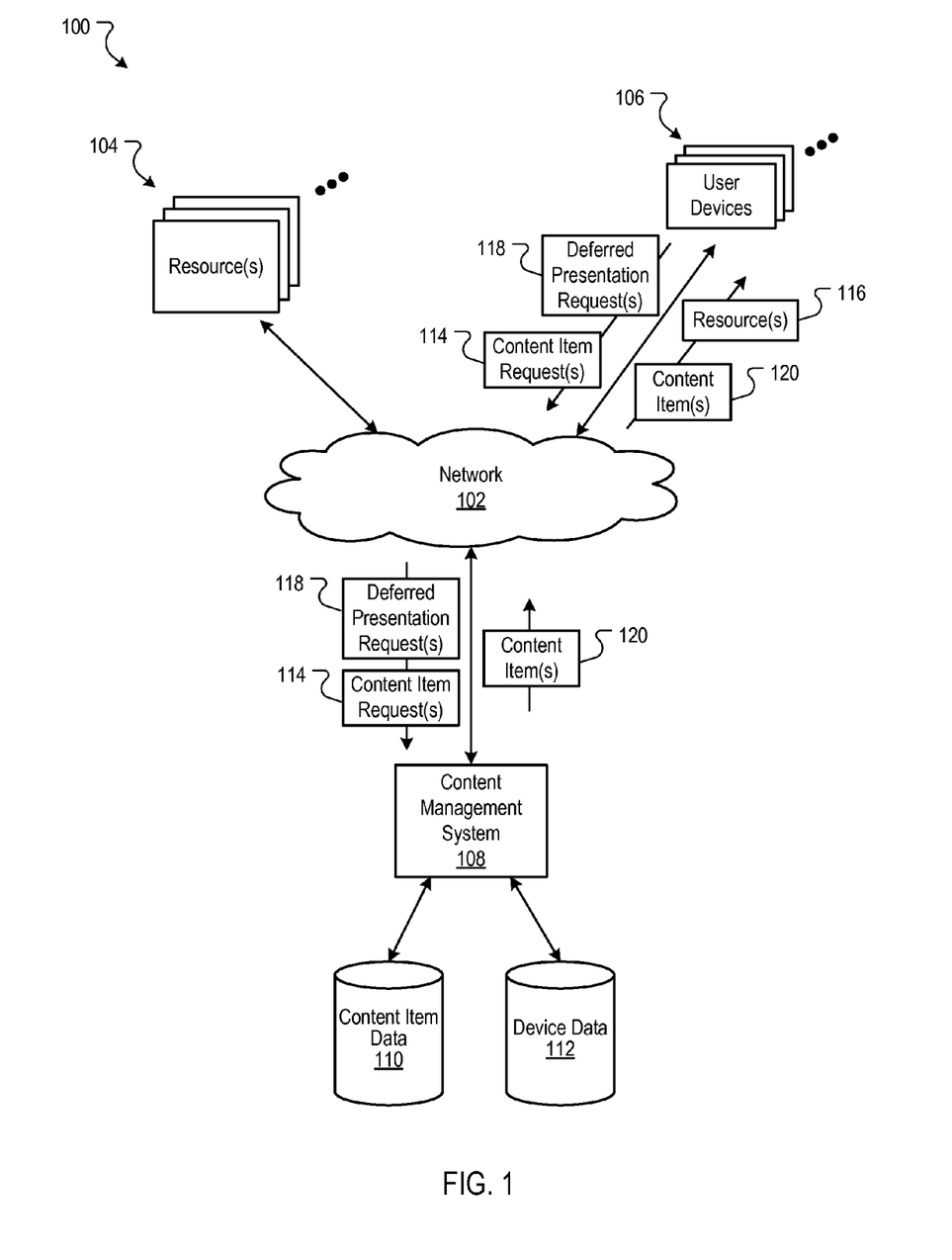
FIG. 1 is a block diagram of an example environment in which a content management system presents deferred content items.

FIG. 1 is a block diagram of an example environment 100 in which a content management system presents deferred content items. A computer network 102, such as a local area network (LAN), wide area network (WAN), the Internet, or a combination thereof, connects publisher resources 104, user devices 106, and the content management system 108. The example environment 100 also includes a content item data store 110, a device data store 112, and may include many thousands of publisher resources 104 and user devices 106.

A resource 104 is any data that can be provided by a publisher over the network 102 and that is associated with a resource address. Resources 104 include HTML pages, word processing documents, portable document format (PDF) documents, images, video, and feed sources, to name just a few. Resources 104 may be associated with a website that is maintained by a content publisher and hosted by one or more servers. The resources 104 can include content, such as words, phrases, pictures, and so on, and may include embedded information (such as meta information and hyperlinks) and/or embedded instructions (such as scripts). The resources 104 may also contain content slots in which content items may be presented.

A user device 106 is an electronic device that is under the control of a user and is capable of requesting and receiving resources 104 over the network 102. Example user devices 106 include personal computers, mobile communication devices, and other devices that can send and receive data over the network 102. A user device 106 typically includes one or more user applications, such as a web browser, to facilitate the sending and receiving of data over the network 102. The web browser can enable a user to display and interact with text, images, videos, music and other information typically located on a web page at a website on the World Wide Web or a local area network. Other applications included in a user device may also use the network 102 to facilitate communication, e.g., between the user device and the content management system 108, resources 104, publishers of the resources or of the application, and other user devices. For example, a video game application may facilitate communications between the user device and a publisher of the video game application as well as the content management system, while a communications application may facilitate communications between the user device and one or more other user devices.

The content management system 108 facilitates the provisioning of content items, such as advertisements, to user devices 106. In particular, the content management system 108 allows content item providers to define selection rules that may take into account attributes associated with resources, applications, and/or user devices to provide specific content items for users. Example selection rules include keyword-based criteria, in which content sponsors provide bids for keywords that are present in search queries, resource content, and application content, and remarketing list based selection, in which content sponsors provide bids for sponsored content items that will be provided to user devices that have a device identifier that is associated with a remarketing list.

Content items can be provided for many different resources 104 and user device applications. For example, a resource or application may include instructions that cause the user device to request content items from the content management system 108. The request may include, for example, a publisher identifier, an application identifier, a device identifier, and/or a keyword identifier related to the content of the resource or application. The content management system 108, in turn, provides content items 120 to the requesting user device.

For example, an application running on the user device may cause the user device to send a content item request 114 to the content management system 108. In response to receiving the content item request 114, the content management system 108 provides one or more content items 120 to the user device 106, e.g., for display in one or more content item slots included in the application interface. In another example, a user device may request a web page from a publisher, and instructions included in the web page may cause the user device to send a content item request 114 to the content management system 108.

In some implementations, the content management system 108, in response to each request for content items, can conduct an auction to select content items to be provided in response to the request. The content items may be ranked according to a score that, in some implementations, is proportional to a value based on a content item bid and one or more parameters, such as those specified in the content item data 110. The highest ranked content items resulting from the auction can be selected and provided to the requesting user device for display in the content slot(s) of a resource. Other selection systems can be used including those that support a reservation model.

User devices 106 may also send the content management system 108 deferred presentation requests 118. A deferred presentation request 118 identifies a particular content item that was provided to the requesting user device and that the user wishes to view at a later time. When the content management system 108 receives a deferred presentation request 118, it may store information related to the request and the user device in the device data store 112, so that the content item identified by the request can be provided to the user device, or another device associated with the user, at a later time and/or using a separate application. For example, if a content item of interest to a user is presented on the user's mobile phone, but the user would prefer to view the content item later and/or on a different user device, the user may interact with the user device or content item in a manner that causes the user device to send the deferred content request to the content management system. Deferred content requests and re-presentation of content items is discussed in further detail below.

The content management system 108 includes a data storage system that stores content item data 110. The content item data 110 may store information related to content items, such as the content items, selection information, remarketing information, and budgeting information for content item providers. For example, the content item data 110 may include historical data indicating which content items were presented with which resources, content slots occupied by previously presented content items, and selection data indicating which content item(s) was/were selected by a user. The events stored in content item data 110 may be used, alone or in combination with other information, to bill content providers for various events. In some implementations, a request to defer content or re-presentation of deferred content may be treated as a billable event separate from an original impression, conversion, etc.

The content management system 108 also includes a data storage system that stores device data 112. The device data 112 may store information related to user devices 106, applications, and deferred content items. For example, the device data 112 may store associations between deferred content items and device identifiers as well as links between device identifiers and applications associated with the same user. This information may, in some implementations, be used to determine content to be provided to user devices, e.g., by inferring user interests separately from an impression, selection, or conversion. While the content item data 110 and device data 112 are depicted separately, in some implementations they may be combined in a single data storage device/system, or spread across multiple storage devices/systems, which may include third party content storage devices/systems, in direct communication with the content management system 108 and/or in remote communication with the content management system 108.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
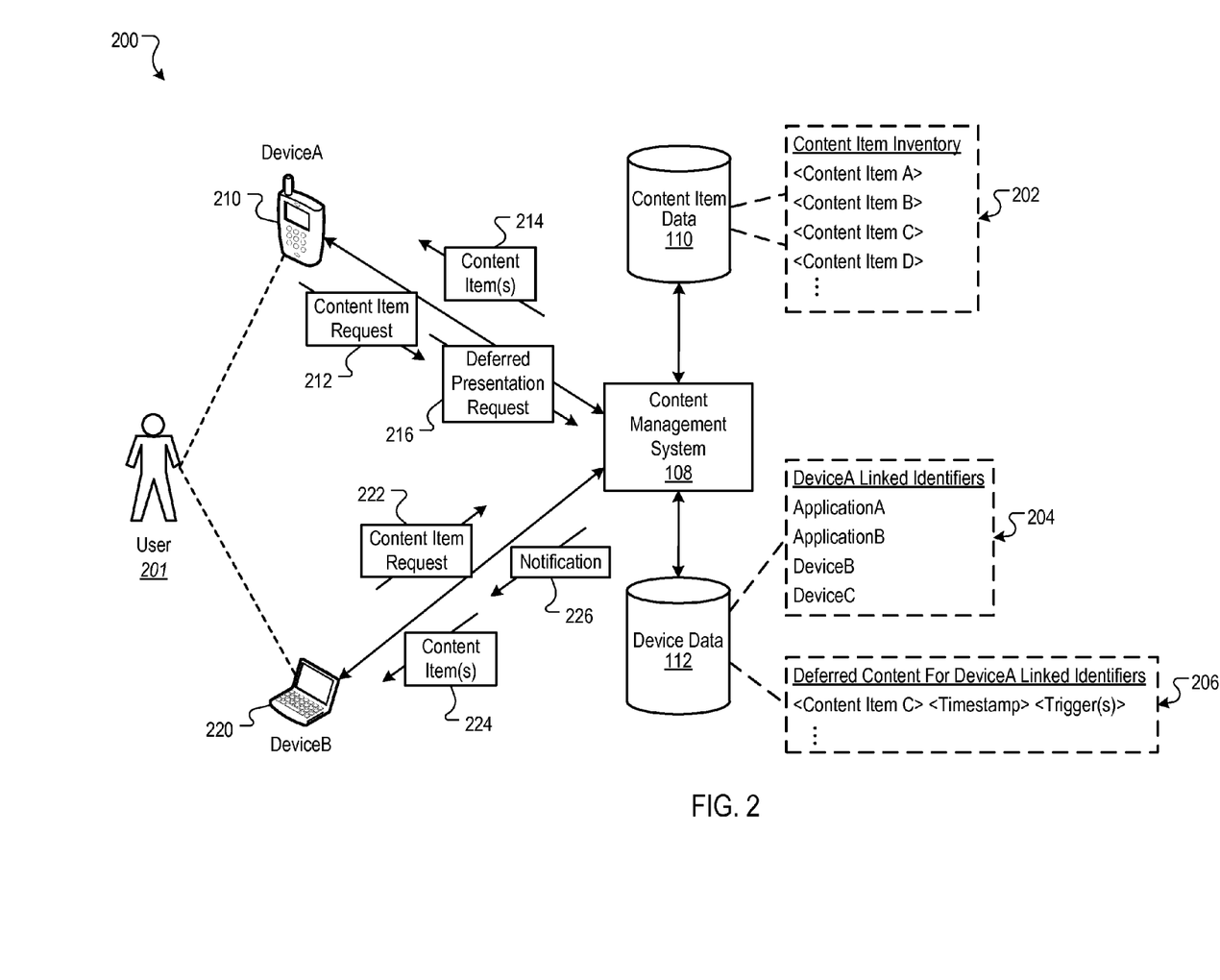
FIG. 2 is an illustration of an example data flow in which a content management system presents deferred content items.

FIG. 2 is an illustration of an example data flow 200 in which a content management system presents deferred content items. In the example data flow 200, the user 201 is associated with two user devices, a mobile phone 210 and a laptop computer 220, which are associated with respective device identifiers, e.g., "DeviceA" and "DeviceB." While using the mobile phone 210, the device sends a content item request 212 to the content management system 108. The content management system 108 accesses content item inventory 202 stored in the content item data 110 to identify and select one or more content items 214 to provide in response to the request 212. For example, the user 201 may be playing a video game on a mobile phone, and the video game may cause the phone to request a video content item from the content management system 108. The content management system 108 may use information included in the request, such as the type of video game and/or the device identifier for the phone, to select a movie trailer to provide in response to the request. The mobile phone, upon receipt of the movie trailer, may play it for the user.

In some implementations, the content management system 108 may conduct an auction of content items that are eligible to be presented in response to the content item request 212. For example, the content item inventory 202 may include some advertisements, some coupons, some video commercials, and/or some movie trailers. Each content item may be ranked according to a score. The scores and/or ranking may be based on, for example, the relevance of the content item to information associated with the content item request 212. The content item request 212 may include, for example, information identifying the requesting source (e.g., the video game that caused the request to be sent). Using this information, content items relevant to the requesting source (e.g., superheroes associated with the video game) may be more relevant to the content item request 212 and more likely to win the auction.

In the example data flow 200, the user 201 causes the mobile phone 210 to send a deferred presentation request 216 to the content management system. Using the previous example, the user may be interested in viewing the movie trailer, but would prefer to view it at another time or on a different device. The user may, in a number of ways, indicate that a deferred presentation request 216 should be sent. For example, content items 214 may include a user interface element, such as a button, control or link, which upon interaction by a user causes the user device to send the deferred presentation request. In some implementations, pre-configured gesture controls may be used to provide an indication to the user device that the deferred content request should be sent for the content item. For example, a user may be able to provide the indication by swiping from left to right on a touch-sensitive device display, or by pressing and holding a finger on the content item using a touch-sensitive device display. Many other methods may be used to provide indications to the user device that a particular content item should be saved for re-presentation later, and the methods may differ depending on the particular device or application used, e.g., a personal computer may use a right-click context menu option to offer a user the option to defer presentation of the content item.

In some implementations, content items include indications that specify which action(s) a user may take for a content item. For example, the movie trailer may include text, "click here to save this movie trailer for later viewing," or "swipe left to right to save this movie trailer for later viewing." In some implementations, other indications may also be provided by a user device. For example, user devices may be able to send indications specifying that the user does not wish to see the content item again, which the content management system may receive and use to prevent the content item from being presented to the user device again.

Upon receipt of the deferred presentation request 216, the content management system 108 stores an identifier associated with the deferred content item in a data structure that associates deferred contents with one or more device identifiers. The example data flow 200 includes a list of deferred content 206 associated with the identifier, DeviceA, and any linked identifiers. The list of deferred content 206 includes a content item identifier for Content Item C, e.g., the content item identified in the deferred presentation request 216. Using the example of the movie trailer, the identifier "Content Item C" may be an identifier that refers to the movie trailer.

The identifier, DeviceA, may be linked with at least one other device or application identifier associated with the user 201. Other device and application identifiers associated with the user 201 may include, for example, identifiers of other user devices, such as other phones, tablets, or personal computers, as well as identifiers of other applications, such as web browsers, video games, productivity applications, and communication applications that are associated with the single user.

Identifiers of devices and applications for a user may be linked using a number of methods. For example, the content management system 108 can link identifiers (e.g., web browser cookies and other application or device identifiers) from multiple devices and/or applications based on explicit or implicit user input. In some implementations, identifiers may be linked without storing personally identifiable information associated with the user. For example, when a user logs onto a user service or application from a first device (e.g., the user's mobile phone), a user tag can be determined that uses a unique identifier associated with the user (e.g., the user's email address, phone number or other personal information). To determine the user tag, the unique identifier can be obfuscated, e.g., using a one-way hash function to create a random or pseudo-random number. The user tag can be mapped to the user's first device. Subsequently, when the user logs into the service/application from a second different device, the same user tag can also be mapped to the second different device. The mapping in these examples can use anonymous identifiers (e.g., cookies, browser cookies, device identifiers, etc.) that are associated with each device. As a result, the mapping can identify and link all of the devices associated with the user without storing personally identifiable information (PII) associated with the user. Other ways of linking identifiers are possible. For example, identifiers, such as cookies, can be linked using various Diffie-Hellman techniques, e.g., that use exchanged private and public keys.

In the example data flow 200, the device identifier for the laptop computer 220 may be linked with the device identifier for the mobile phone 210, e.g., using one of the aforementioned identifier linking methods. For example, a browser cookie associated with a web browsing application on the mobile phone 210 may be linked with a browser cookie associated with another web browsing application on the laptop computer. This allows the content management system 108 to use data provided by any of the user's devices to respond to requests from any of the user's other devices and applications.

In some implementations, other information may be stored when a deferred content item request is received. For example, a timestamp that indicates a time the content item was first presented or deferred may be stored for deferred content items. In addition, one or more triggers may be determined and stored for deferred content items. A trigger may specify conditions for re-presenting the deferred content item. The trigger may be determined, for example, by the content management system 108, by the user 201, and/or by a content item provider/sponsor. For example, the deferred presentation request 216 may include information specified by the user 201 regarding when the content item should be re-presented, e.g., the user may have a default setting to be reminded in a week or may choose a particular time to be re-presented with the content item using, for example, a drop-down menu included in the content item.

In some implementations, content sponsors may specify when deferred content items should be re-presented using triggers. For example, if the content item is an advertisement or coupon for a restaurant, the content sponsor may choose to have deferred advertisements and/or coupons re-presented at or around certain times, e.g., between 3:00 and 5:00 p.m. on weekdays and between 10:00 a.m. and 7:00 p.m. on weekends. In this example, the trigger associated with the advertisement or coupon may cause it to only be re-presented at one of the specified times. Other example triggers may include: a trigger that enables re-presentation in response to a particular action, such as the user device accessing a particular application; a trigger that enables re-presentation in response to detecting that the user device is in a particular physical location, e.g., using GPS, WiFi, or another method to determine when the user device is near a particular location; and a trigger that enables re-presentation of a content item in response to a particular keyword being associated with a content item request, e.g., if a trigger keyword for a content item is "superhero," the content item may be eligible for re-presentation in response to a content item request specifying a keyword related to "superhero." Triggers may also be negative triggers that specify when a deferred content item should not be re-presented. For example, a content sponsor may not want their content item re-presented in particular applications, at particular times, and/or at particular locations.

In some implementations, the content management system 108 may determine a relevant time associated with a deferred content item and set a trigger to re-present the content item at that relevant time. For example, if the deferred content item is an advertisement that includes a date for a particular sale, the trigger may be set to re-present the advertisement before the end of the sale. As another example, a deferred movie trailer may have a trigger set to re-present the movie trailer just before and/or after the movie's release.

In some implementations, triggers are used to provide reminders to a user device associated with the corresponding content item. For example, if a user defers a coupon that has an expiration date, the content management system 108 may set a trigger that causes the content management system 108 to send a reminder to the user (on one or more of the linked devices/applications) that the user has deferred content waiting for them. In some implementations, the reminder may include a description of, a portion of, or the entire deferred content item. For example, a reminder may be an e-mail or pop-up that notifies the user that the user has a deferred coupon expiring soon with a link to view the deferred coupon. Triggers may be used to provide deferred content and/or reminders regarding deferred content both automatically and/or in response to a request for content.

In the example data flow 200, the content management system receives a second content item request 222 from a second device associated with the user 201. The content item request includes the device identifier, "DeviceB," which the content management system 108 may use to determine that the second device, the laptop computer 220, is linked to the first device with the first identifier, "DeviceA."

The content management system 108 identifies one or more candidate content items responsive to the content item request 222. This may include, for example, evaluating device data associated with linked identifiers to determine whether an identifier for a deferred content item is included in the device data 112. For example, based on the identifier, "DeviceB," being linked to the identifier, "DeviceA," the content management system 108 may identify "Content Item C" in the deferred content for DeviceA linked identifiers 206 and determine that the corresponding content item, e.g., a deferred movie trailer, is eligible for re-presentation in response to the content item request 222.

In some implementations, the content management system may identify candidate content items without the user 201 being logged into a service associated with the content management system 108. For example, a device identifier included in the request may include all the information needed for the content management system 108 to determine candidate content items, including deferred content items that are stored in the device data 112, e.g., based on a link between the device identifier included in the content item request 222, "DeviceB," and the first device identifier, "DeviceA."

In some implementations, the content management system 108 determines which candidate content item should be provided in response to the content item request 222 in the same or similar manner as the first content item request 212, e.g., identifying relevant content items in the content item data 110 and conducting an auction to select the content item to be presented. In some implementations, deferred content items may be added to a content item auction. In situations where a deferred content item is already a candidate content item, an auction score for the deferred content item may be adjusted, e.g., increased, to affect the likelihood that the deferred content item will be selected as a result of the auction. In some implementations, deferred content items that are eligible for re-presentation are always prioritized over other candidate content items.

In implementations where content items, including deferred content items, are ranked for an auction, deferred content items may have their corresponding relevance scores and/or ranking adjusted. For example, the amount of time elapsed between receipt of the deferred presentation request 216 and receipt of the second content item request 222 may be used to adjust the score of a deferred content item, e.g., a deferred content item may be ineligible for selection within a certain time period after being deferred, or only eligible during a particular time window specified by a trigger for the deferred content item. As another example, an urgency to re-present a deferred content item may be used to adjust a score or ranking for the deferred content item, e.g., if the deferred content item is a coupon that is expiring soon or an advertisement for a promotion that is ending soon, an increased urgency may lead to an increased score or ranking for the deferred content item, leading to an increased likelihood that it will be provided in response to the content item request 222.

When the content management system 108 selects a deferred content item for re-presentation, the content management system 108 provides the second user device 220 with the deferred content item, e.g., content item C. In some implementations, the deferred content item is altered or augmented prior to re-presentation to clearly distinguish the deferred content item as one that is being re-presented. For example, "You previously requested to see this content again," may be added as a text overlay to a movie trailer when re-presented at a second user device. In some implementations, the deferred content item is reformatted to fit a particular content presentation environment. For example, certain devices and applications may require content items be re-presented in a particular size and/or file format, and the content management system 108 may reformat the deferred content item for re-presentation. Reformatting may include other changes to the deferred content item as well, such as a change from a video format to an audio format, or reformatting a visual content item into a calendar event that includes a reminder and the visual content item, to name a few.

In some implementations, the content management system 108 provides the second user device 220 with a link to a resource that includes one or more previously deferred content items. For example, the content management system 108 may provide user devices with a link to a web page that shows content items the user previously deferred, allowing the user to view and interact with the deferred content items. In implementations where users specify when deferred content items are re-presented, the web page may also include controls for altering how deferred content items are re-presented, e.g., by changing frequency of re-presentation, whether the user prefers a link to the deferred content item or the deferred content item itself, creating triggers for re-presentation of content, and removing content items from the user's deferred content items.

The content management system 108 may, in some implementations, provide a user device with a notification 226 or the deferred content item without receiving a second content item request 222. For example, if a condition specified by a trigger associated with a deferred content item is met, an e-mail reminder, pop-up notification, or other notification may be provided to the user device by the content management system 108, e.g., a notification that informs the user of the deferred content item(s) being available for viewing. The notification may also include a link to the deferred content item or to a web page that includes multiple content items deferred by linked user devices and/or applications.

In some implementations, the content management system may provide notifications or reminders of deferred content using particular services or applications associated with the content management system. For example, a map application associated with the content management system may, when in use by the user, provide a notification of a deferred content item that has a corresponding location at that location on the map. Another example may include an electronic communications service that may provide deferred content items as an electronic communication at a time the user is accessing the service. A calendar application is another example application that may be associated with the content management system, and the calendar may include events or entries associated with a deferred content item, e.g., the release date of a movie that corresponds to a movie trailer may be added to a user's calendar when the movie trailer is deferred. Other methods may also be used by associated services and applications to control notification of and re-presentation of deferred content items within the corresponding services and applications.

In some implementations, the request for content may be associated with a plug-in for a particular application, and determining one or more candidate content items responsive to the request may include determining that the candidate content item is eligible for re-presentation in a particular manner specified by the plug-in. Associated services and applications may use plug-ins to facilitate the delivery of deferred content items through the services and applications in any number of formats. For example, a map application may include a plug-in that causes a user device using the application to request deferred content that is associated with a location on a map, and the plug-in may cause re-presentation of the deferred content item within the map application in a format specified by the map application and/or plug-in.

In some implementations, one or more of the device and/or application identifiers may be encrypted to prevent third parties from retrieving content items stored by the user 201. Other communications between user devices and the content management system may also be encrypted. In addition, while the example data flow 200 depicts two user devices, deferred content items may be re-presented on a single user device and application or many user devices and applications. For example, a user may defer a content item using a web browser of a personal computer and be re-presented with the deferred content item using the same web browser of the same personal computer. As another example, a content item deferred when presented in a video game on a user's mobile phone may be re-presented in a music application on the same mobile phone or on a different user device.

Figure 3A:
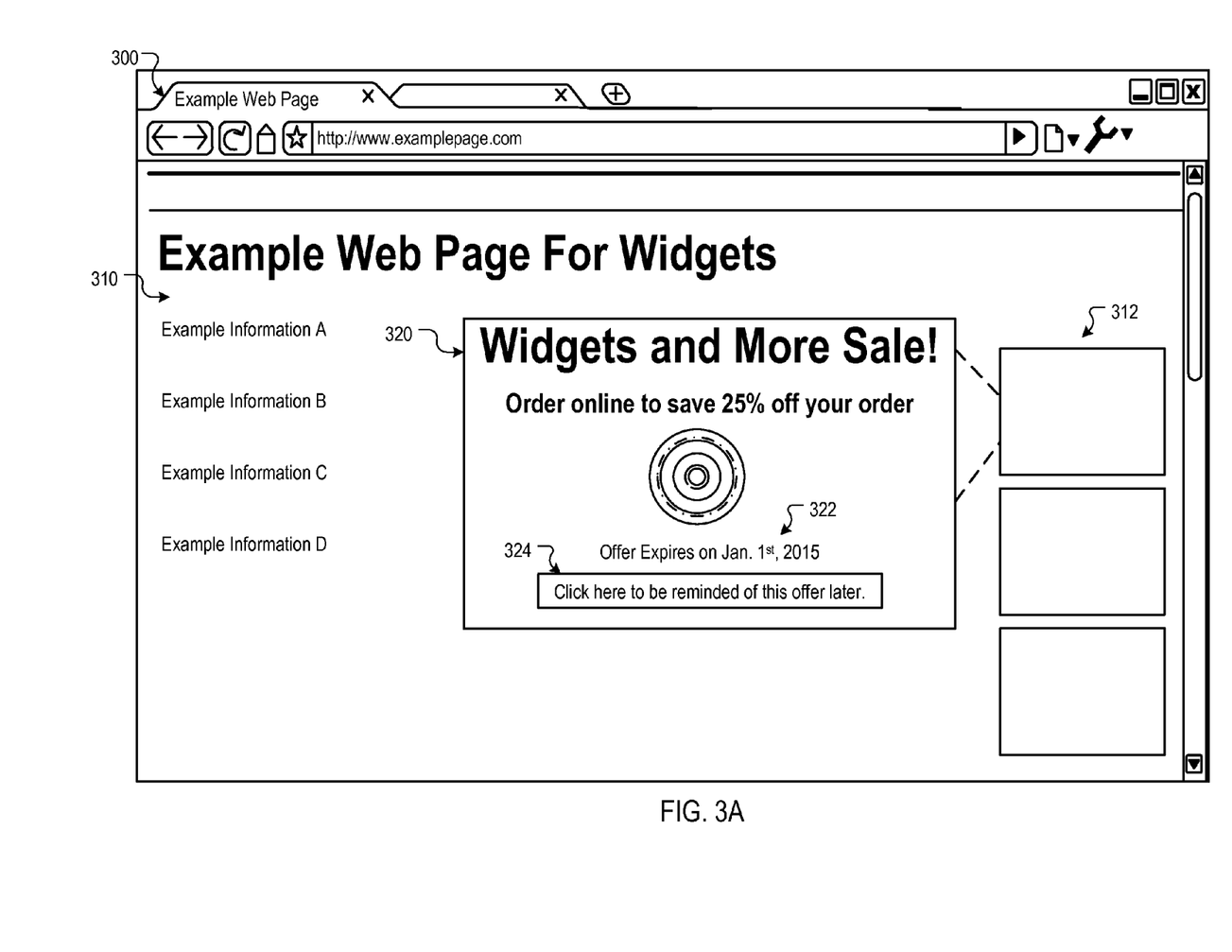
FIG. 3A is an illustration of an example content item presentation.
Figure 3B:
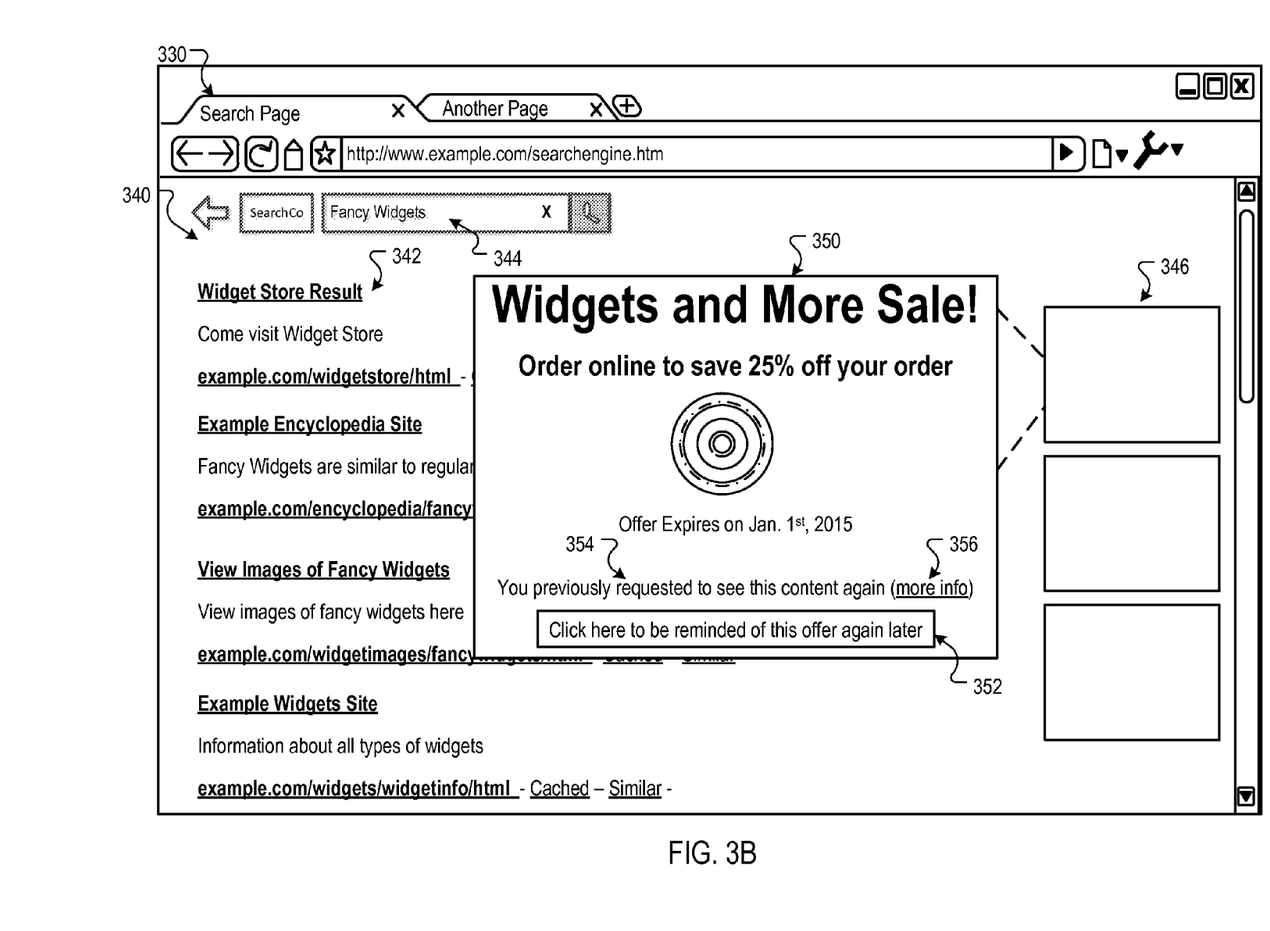
FIG. 3B is an illustration of an example re-presentation of a content item.
Figure 3C:
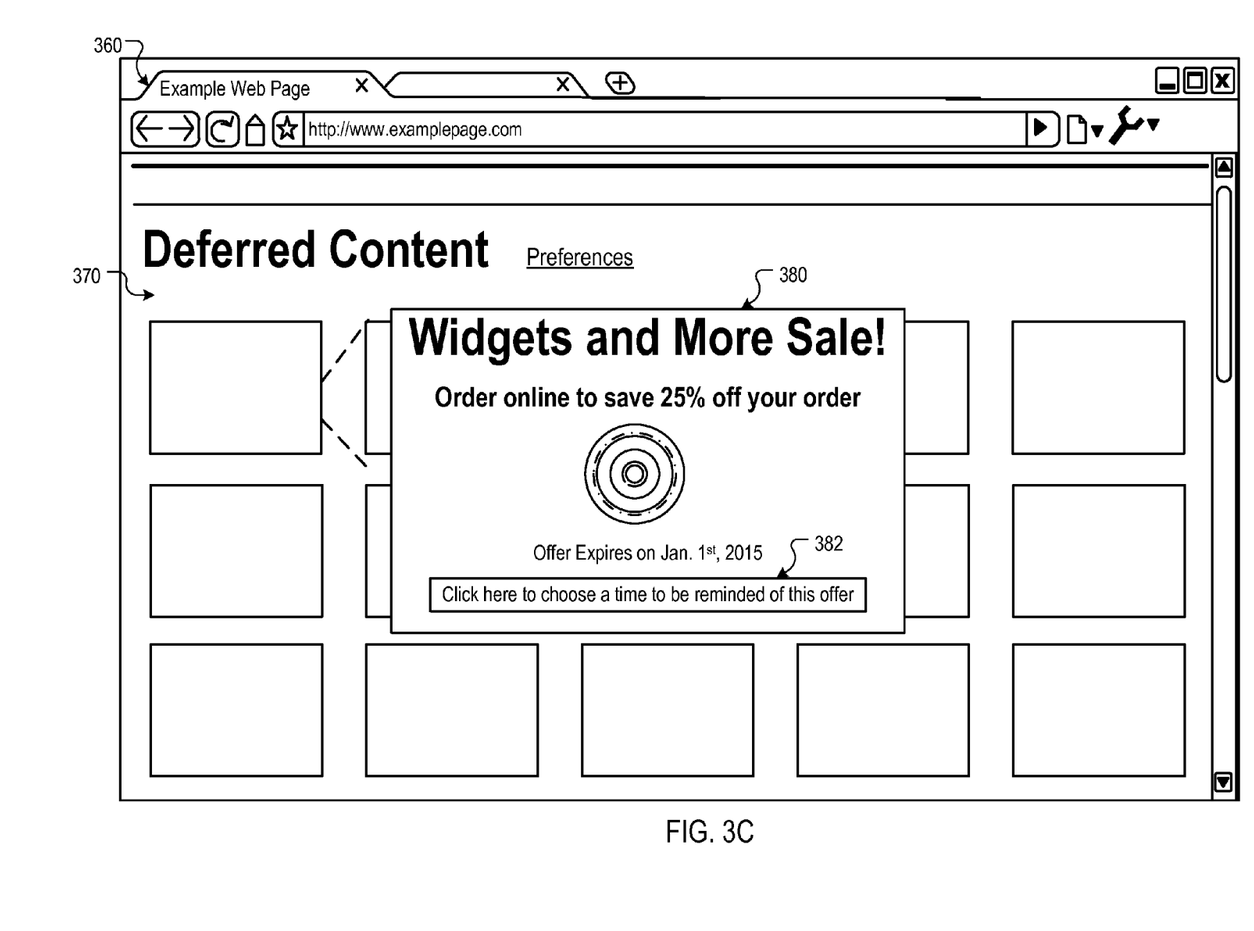
FIG. 3C is an illustration of an example web page for presentation of deferred content items.

FIGS. 3A, 3B, and 3C depict examples of presenting content items and re-presenting deferred content items. While the examples are depicted in a web browsing application, as noted above, presenting and re-presenting content items may be performed for a variety of applications and user devices.

FIG. 3A is an illustration of an example content item presentation. The example environment 300 is a web browsing application that depicts an example web page 310 for widgets. The example web page 310 has three content item slots 312 on the right-hand side. When the user device running the web browser loads the web page 310, the web page 310 may include instructions that cause the user device to request, from a content management system, content items to fill the three content item slots 312.

One example content item 320, enlarged for illustrative purposes, is an advertisement for a widget sale. The example content item 320 includes information regarding the sale, including an expiration date 322 of Jan. 1, 2015. The content item 320 also includes a button 324 that, upon selection by the user, causes the user device to send an indication to the content management system that the content item 320 should be re-presented at a later time. In some implementations, the button 324 is included in the content item 320 when it is created, e.g., by the sponsor of the content item. In some implementations, the button 324 is added by the content management system, e.g., after the content item 320 has been created, and before or as the content item is served to the user device.

The expiration date 322 included in the content item 320 may, in some implementations, be associated with a trigger for re-presentation of the content item 320. A trigger, for example, may specify that the content item should be eligible for re-presentation for the week up to and including Jan. 1, 2015. This trigger may be pre-determined by the sponsor of the content item, configurable by the user, or automatically determined by the content management system. The content management system may determine times and/or dates relevant to a content item, and a trigger, in any number of ways. For example, the text of a content item may be analyzed to identify one or more dates relevant to a content item, audio content items may be transcribed to obtain a relevant date, and frames of video and images may be analyzed using, for example optical character recognition techniques, to identify relevant dates included in content items. Relevant dates may include, for example, expiration dates, launch dates, and availability date ranges, to name a few.

As noted above, the example content item 320 and display environment 300 are one example of content presentation. In some implementations, content items do not include dates or buttons for user interaction. For example, a touch-screen phone may use gesture commands, such as a swipe, to cause the phone or application to send an indication to a content management system that the content item should be re-presented. As another example, a wearable computing device may use audio commands, such as a user speaking, "show me this content item later," to cause the computing device or an application to send the indication to the content management system.

FIG. 3B is an illustration of an example re-presentation of a content item. The example environment 330 is a web browsing application that depicts an example web page 340 for a search engine. The web page 340 includes search results 342 for a search query 344, "fancy widgets." The web page 340 also includes three content item slots 346 for presenting content items. The re-presented content item 350, enlarged for illustrative purposes, is a re-presentation of the first content item 320. In this example, the re-presented content item 350 is similar to the original content item 320 and includes a button 352 that can be used to defer the content item 350 again. This example re-presented content item 350 has been altered by the content management system to include an indication 354 that the content item 350 was previously deferred. The re-presented content item 350 also includes a link 356 to more information, e.g., an HTML link to a web page for managing deferred content, such as the web page described in FIG. 3C.

As previously noted, the example re-presented content item 350 and display environment 330 are one example of re-presentation of deferred content. The re-presented content item 350 may have been provided based on a trigger, such as a current date matching a date specified by the trigger, or based on the submission to a search engine of a search query specified by the trigger, e.g., queries related to "widgets." In addition, while the example re-presented content item 350 has been augmented, in some implementations a re-presented content item may be identical to the original content item. While both the original presentation and re-presentation are both depicted in a web browsing application and in a web page, other devices and applications may provide access to content items and re-presented content items, as described above.

FIG. 3C is an illustration of an example web page for presentation of deferred content items. The example environment 360 is a web browsing application that depicts an example web page 370 for deferred content. The example web page 370 depicts a grid of deferred content items, e.g., for the device or application identifier associated with the user device or web browser and all linked identifiers. Selection of a content item on the web page may be treated in a manner similar to the manner in which content item selection is handled on other web pages or in other applications, e.g., by causing the user device to navigate to the content sponsor's web page specified by the selected content item. The re-presented content item 380, enlarged for illustrative purposes, is a re-presentation of the first content item 320, and it includes a button 382 that allows a user to elect to be reminded of the offer at a later time. The example web page 370 may, in some implementations, also include controls that allow a user to customize the user's preferences with respect to storage and delivery of deferred content items and notifications.

A web page for deferred content may be presented in a variety of formats. For example, deferred content items may be provided in a list, organized by topic or type, and/or organized according to an urgency ranking or score, e.g., based on expiration dates and/or trigger conditions. Deferred content may also be presented in applications other than a web browser, such as a content viewing application provided by the content management system for use on a mobile device.

Figure 4:
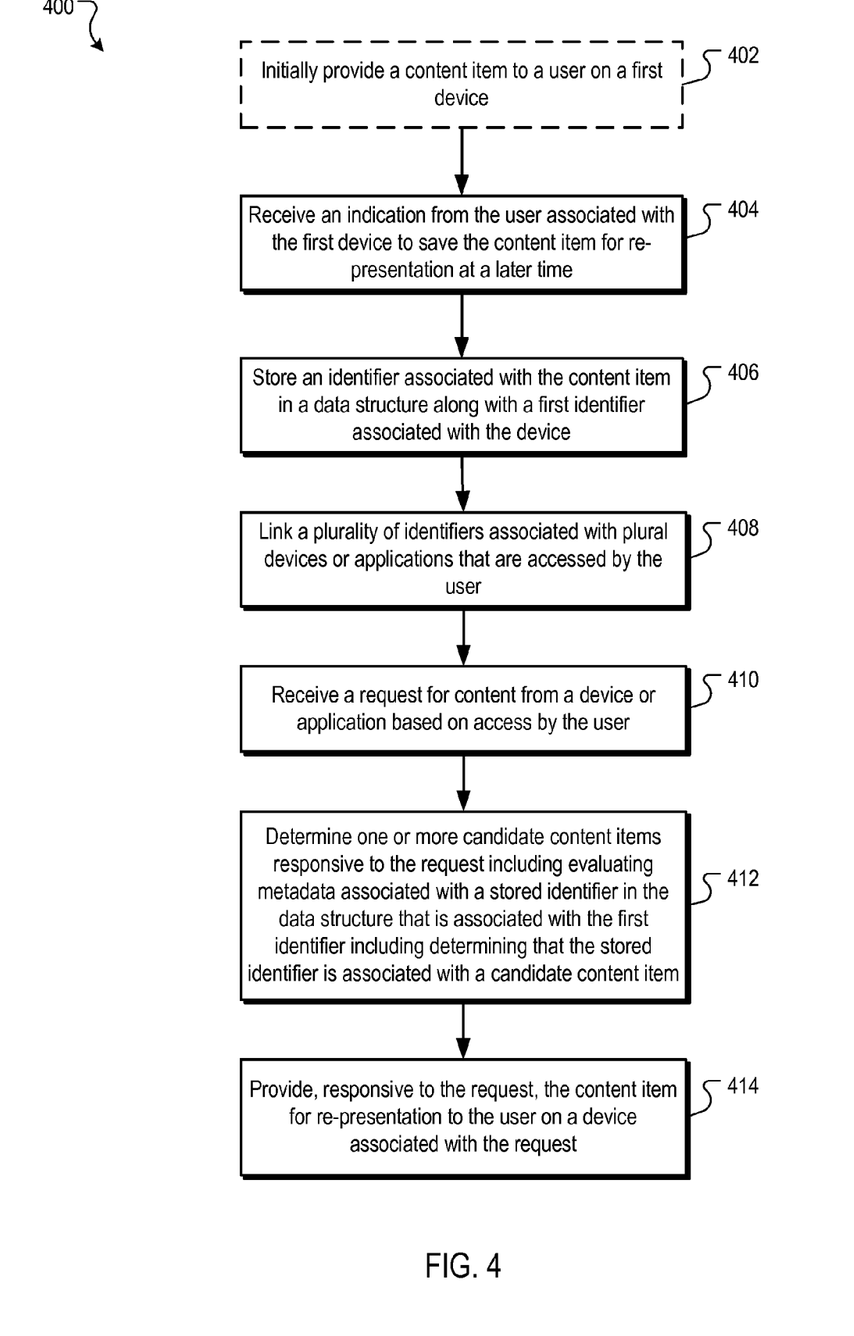
FIG. 4 is a flow diagram of an example process for presenting deferred content items.

FIG. 4 is a flow diagram of an example process 400 for presenting deferred content items. The process 400 may be performed by one or more data processing apparatus, such as a content management system.

A content item is, in some implementations, initially provided to a user on a first device, including providing code for enabling the user to cause storage of the content item or an identifier thereto in the data structure for re-presentation (402). For example, a content management system may provide a user's mobile phone with an advertisement along with code that allows the user to swipe the advertisement in a particular direction to cause the content management system to store the content item for re-presentation.

After presentation of a content item on a first device, an indication is received from a user associated with the first device to save the content item for re-presentation at a later time (404). For example, the first device may be a mobile phone, and the user may cause the mobile phone to provide an indication to the content management system that specifies a particular content item should be re-presented later.

In some implementations, information for controlling when to re-present the content item, including one or more preferences for re-presentation of the user, may be received along with the indication. For example, if a user has preferences that specify deferred content items are to be delivered within 72 hours of providing the indication and at a particular user device, that information may be included in the indication.

In some implementations, one or more criteria for controlling re-presentation of the content item to users is received from a content sponsor, and the content item may only be re-presented when the criteria are satisfied. For example, an advertiser may specify that an advertisement should not be re-presented less than 1 day after it was deferred and not more than two weeks after it was deferred, or that the content item should only be re-presented to a user device when the user enters a particular search query or visits a web page related to a particular topic.

An identifier associated with the content item is stored in a data structure along with a first identifier associated with the first device (406). For example, an advertisement may have an identifier, and that identifier can be added to a data structure and associated with a cookie identifier for the first device. In some implementations, the first identifier may be encrypted to prevent third parties from retrieving content items stored by the user. Other security measures may also be used to protect data.

Optionally, a plurality of identifiers associated with plural devices or applications that are accessed by the user are linked, including linking the first identifier with a second different identifier associated with a different device or application than one associated with the first identifier (408). For example, the same user may use a mobile phone, a tablet, a laptop computer, and a desktop computer, and multiple applications on each device. Each device, and one or more applications on the devices, may have identifiers associated with them that may be linked by a content management system based on the identifiers being associated with the same user. In some implementations, linking a plurality of identifiers includes linking plural cookies, each associated with the user and either a different device or application.

A request for content is received from a device or application based on access by the user, the receipt includes receiving one of either the first identifier or one of the plurality of identifiers that is linked to the first identifier along with the request (410). For example, the request may include a device or application identifier that is either the first identifier or one or the plurality of linked identifiers. In some implementations, the request for content is received from a second different device. For example, the first device may be a mobile device, and the request for content may be received from a different non-mobile device.

One or more candidate content items responsive to the request are determined, the determination including evaluating metadata associated with a stored identifier in the data structure that is associated with the first identifier, and including determining that the stored identifier is associated with a candidate content item (412). Evaluating metadata may include, for example, evaluating timestamps and triggers for deferred content items, e.g., to determine if a condition specified by a trigger for a deferred content item is met. For example, a content item that was deferred and stored in the data structure and associated with the first identifier may be identified as a candidate content item based on its association with the first identifier in the data structure, and based on one or more conditions specified by one or more triggers being satisfied by data included in the content request and/or a timestamp associated with the deferred content item.

In some implementations, the one or more candidate content items may be determined without the user being logged into a service associated with an entity that is responding to the request. For example, a first or second user device sending the content item request to the content management system need not be logged into a service provided by the content management system. The device or application identifier provided by the requesting device may be used to identify candidate content items, including deferred content associated with the identifier or other linked identifiers.

In some implementations, an auction may be conducted that includes the candidate content items, and a content item that is a winner of the auction may be selected. For example, the content management system may rank both non-deferred and deferred content items and produce scores for evaluation in an auction. The ranking of deferred content items may be based on: a relevance of the deferred content item to other information associated with the request, a time elapsed between receipt of the indication and receipt of the request, and/or an urgency to re-present the content item based on one or more factors.

The content item is provided, responsive to the request, for re-presentation to the user on a device associated with the request, based on a comparison of information associated with the request and information associated with the content item. For example, information associated with the request may indicate that the request is from a device having an identifier that is linked to the first identifier with which the content item was associated and stored with in the data structure.

In some implementations, a trigger associated with the content item is determined, and a reminder is provided to a device associated with the user upon occurrence of the trigger. Determining a trigger may include determining a relevant time associated with the content item and providing the reminder at a time based on the relevant time. For example, the relevant time may be an occurrence of an event that is described by the content item or an expiration of an offer associated with the content item. In some implementations, a control is provided with the reminder that, when selected, causes re-presentation of the content item to the user. The reminder may include the content item or a link to view the content item and may be provided as a pop-up window, an e-mail, or other notification type that may depend on the type of user device.

In some implementations, providing the content item for re-presentation includes altering or augmenting the content item to clearly distinguish the content item as being a re-presented content item. For example, text may be added to a re-presented content item that notifies the user that the content item was previously deferred by the user.

In some implementations, providing the content item for re-presentation includes presenting a uniform resource locator for a resource that includes one or more previously saved content items that are each associated with a respective content item identifier and one of either the first identifier or one of the identifiers that is linked to the first identifier. For example, the content management system may provide a notification to a user device that includes a link to a web page or other application that displays content items deferred by the user device or other devices linked to the identifier of the user device, e.g., as in the example web page discussed with respect to FIG. 3C.

Figure 5:
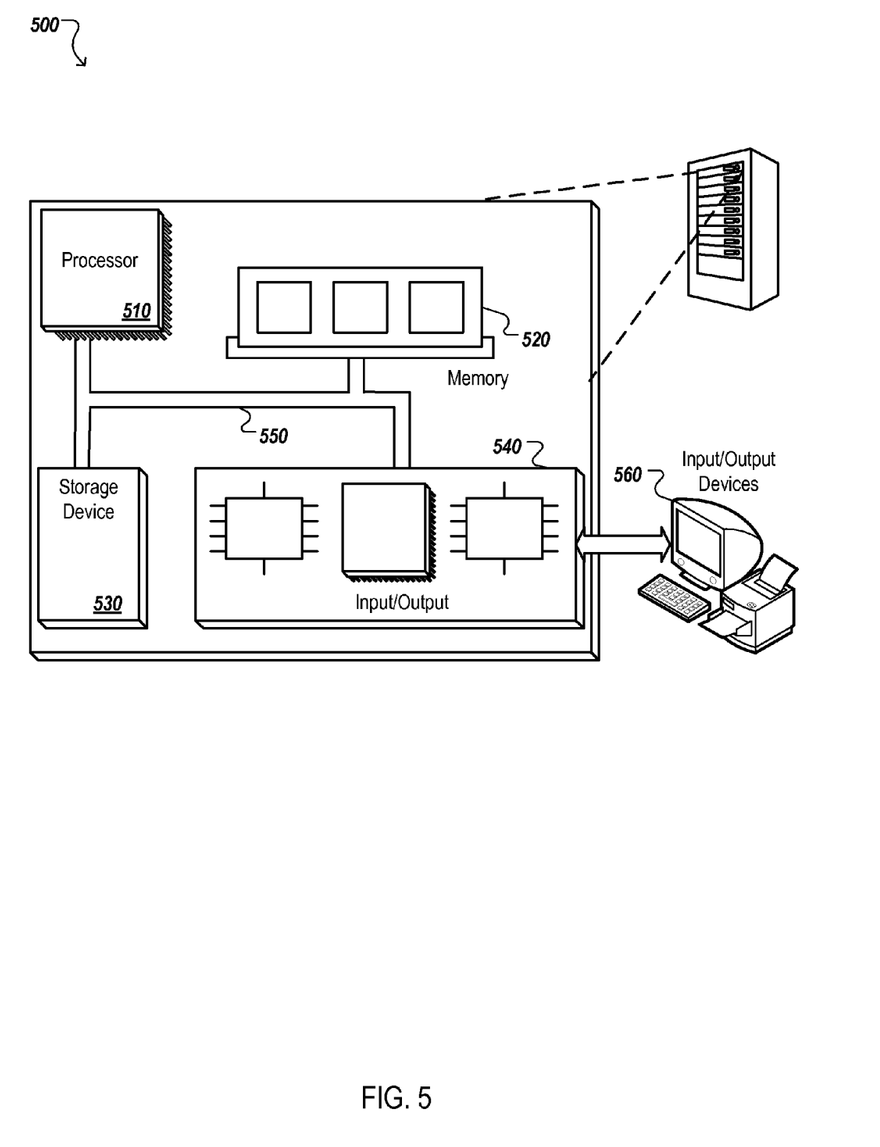
FIG. 5 is a block diagram of an example data processing apparatus.

FIG. 5 is a block diagram of an example data processing apparatus 500. The apparatus may be used to perform the operations described above. The apparatus 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the apparatus 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the apparatus 500. In one implementation, the storage device 530 is a computer-readable medium. In various different implementations, the storage device 530 can include, for example, a hard disk device, an optical disk device, a storage device that is shared over a network by multiple computing devices, e.g., a cloud storage device, or some other large capacity storage device.

The input/output device 540 provides input/output operations for the apparatus 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc. Although an example data processing apparatus has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
   after presentation of a content item on a first device, receiving an indication from a user associated with the first device to save the content item for re-presentation at a later time;
   storing an identifier associated with the content item in a data structure along with a first identifier associated with the first device;
   linking a plurality of identifiers associated with plural devices, browsers, or applications that are accessed by the user, including linking the first identifier with a sec- ond different identifier associated with a different device or application than one associated with the first identifier;

receiving a request for content from a device or application based on access by the user, including receiving one of either the first identifier or one of the plurality of identifiers that is linked to the first identifier along with the request;

determining one or more candidate content items responsive to the request including evaluating metadata associated with a stored identifier in the data structure that is associated with the first identifier including determining that the stored identifier is associated with a candidate content item; and providing, responsive to the request, the content item for re-presentation to the user on a device associated with the request, based on a comparison of information associated with the request and information associated with the content item.

2. The method of claim 1, wherein linking a plurality of identifiers includes linking plural cookies, each associated with the user and either a different device, or application.

3. The method of claim 1, wherein the request for content is received from a second different device.

4. The method of claim 1, wherein the first device is a mobile device and the request for content is received from a different non-mobile device.

5. The method of claim 1, further comprising conducting an auction including the candidate content items, and selecting the content item when the content item is a winner of the auction.

6. The method of claim 5, further comprising ranking the content item and producing a score for evaluation in the auction, wherein the ranking is based on one or more of a relevance of the content item to other information associated with the request, a time elapsed between receipt of the indication and receipt of the request, or an urgency to re-present the content item based on one or more factors.

7. The method of claim 1, further comprising:
determining a trigger associated with the content item; and
providing a reminder to a device associated with the user upon occurrence of the trigger.

8. The method of claim 7, wherein determining the trigger includes determining a relevant time associated with the content item and providing the reminder at a time based on the relevant time.

9. The method of claim 8, wherein the relevant time is one of an occurrence of an event that is described by the content item or an expiration of an offer associated with the content item.

10. The method of claim 7, further comprising providing a control with the reminder that, when selected, causes re-presentation of the content item to the user.

11. The method of claim 1, wherein the determining one or more candidate content items includes determining one or more candidate content items without the user being logged into a service associated with an entity that is responding to the request.

12. The method of claim 1, further comprising initially providing the content item to the user on the first device, including providing code for enabling the user to cause storage of the content item in the data structure for re-presentation.

13. The method of claim 1, further comprising receiving, along with the indication, information for controlling when to re-present the content item, including one or more preferences for re-presentation of the user.

14. The method of claim 1, further comprising receiving, from a content sponsor, one or more criteria for controlling re-presentation of the content item to users, and re-presenting the content item only when the criteria are satisfied.

15. The method of claim 1, wherein providing the content item for re-presentation includes altering or augmenting the content item to clearly distinguish the content item as being a re-presented content item.

16. The method of claim 1, wherein providing the content item for re-presentation includes presenting a uniform resource locator for a resource that includes one or more previously saved content items that are each associated with a respective content item identifier and one of either the first identifier or one of the plurality of identifiers that is linked to the first identifier.

17. The method of claim 1, further comprising encrypting the first identifier to prevent third parties from retrieving content items stored by the user.

18. The method of claim 1, wherein the request for content is associated with a plug-in for a particular application, and wherein determining one or more candidate content items responsive to the request includes determining that the candidate content item is eligible for re-presentation in a particular manner specified by the plug-in.

19. A system comprising:
one or more data processing apparatus; and
a data store storing instructions that, when executed by the one or more data processing apparatus, cause the one or more data processing apparatus to perform operations comprising:
after presentation of a content item on a first device, receiving an indication from a user associated with the first device to save the content item for re-presentation at a later time;
storing an identifier associated with the content item in a data structure along with a first identifier associated with the first device;
linking a plurality of identifiers associated with plural devices, browsers, or applications that are accessed by the user, including linking the first identifier with a second different identifier associated with a different device or application than one associated with the first identifier;
receiving a request for content from a device or application based on access by the user, including receiving one of either the first identifier or one of the plurality of identifiers that is linked to the first identifier along with the request;
determining one or more candidate content items responsive to the request including evaluating metadata associated with a stored identifier in the data structure that is associated with the first identifier including determining that the stored identifier is associated with a candidate content item; and
providing, responsive to the request, the content item for re-presentation to the user on a device associated with the request, based on a comparison of information associated with the request and information associated with the content item.

20. A computer readable medium storing instructions that, when executed by one or more data processing apparatus, cause the one or more data processing apparatus to perform operations comprising:
after presentation of a content item on a first device, receiving an indication from a user associated with the first device to save the content item for re-presentation at a later time;

storing an identifier associated with the content item in a data structure along with a first identifier associated with the first device;

linking a plurality of identifiers associated with plural devices, browsers, or applications that are accessed by the user, including linking the first identifier with a second different identifier associated with a different device or application than one associated with the first identifier;

receiving a request for content from a device or application based on access by the user, including receiving one of either the first identifier or one of the plurality of identifiers that is linked to the first identifier along with the request;

determining one or more candidate content items responsive to the request including evaluating metadata associated with a stored identifier in the data structure that is associated with the first identifier including determining that the stored identifier is associated with a candidate content item; and providing, responsive to the request, the content item for re-presentation to the user on a device associated with the request, based on a comparison of information associated with the request and information associated with the content item.

* * * * *